(No Model.)  3 Sheets—Sheet 1.

G. NOETZEL.
INSTRUMENT FOR OPTICAL OBSERVATIONS.

Figure 1:
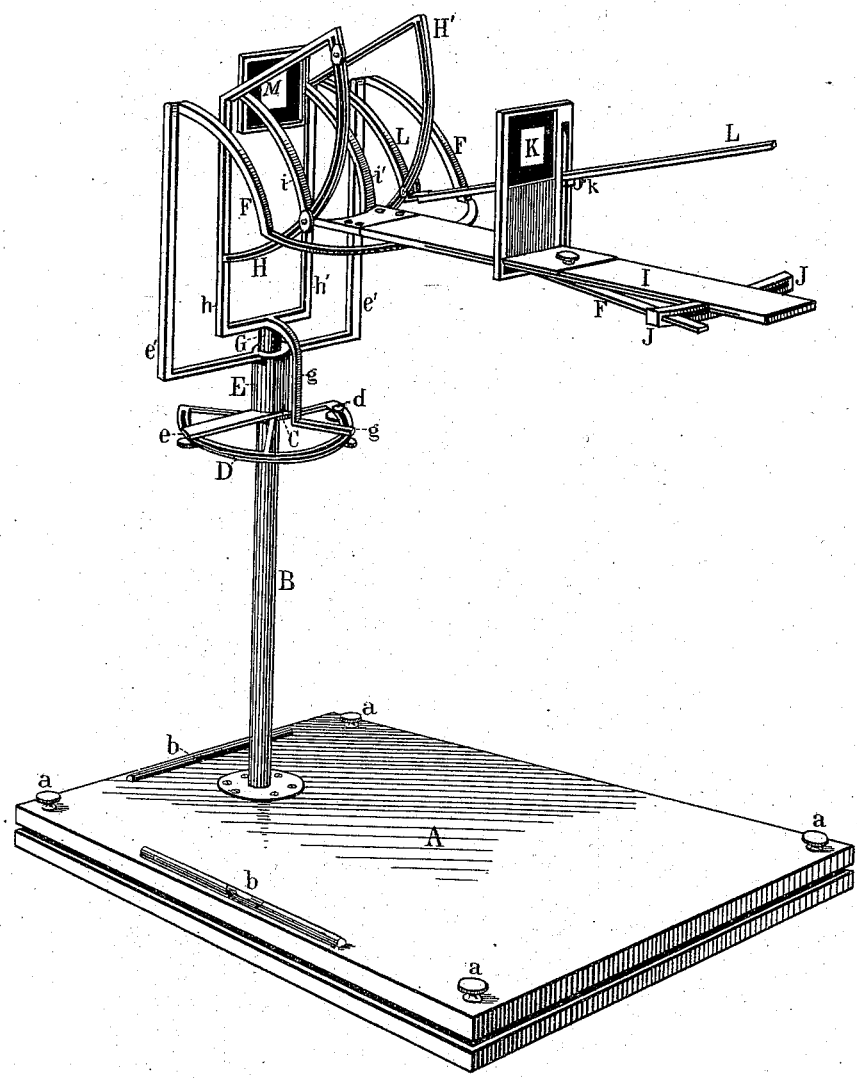

No. 554,294.    Fig. 1    Patented Feb. 11, 1896.

Witnesses
Robt. T. Platt
John Stonell

Gregor Noetzel
Inventor.

(No Model.) 3 Sheets—Sheet 3.
G. NOETZEL.
INSTRUMENT FOR OPTICAL OBSERVATIONS.

No. 554,294. Patented Feb. 11, 1896.

Witnesses.

Inventor

UNITED STATES PATENT OFFICE.

GREGOR NOETZEL, OF WASHINGTON, DISTRICT OF COLUMBIA.

INSTRUMENT FOR OPTICAL OBSERVATIONS.

SPECIFICATION forming part of Letters Patent No. 554,294, dated February 11, 1896.

Application filed April 9, 1895. Serial No. 545,042. (No model.)

*To all whom it may concern:*

Be it known that I, GREGOR NOETZEL, a citizen of Prussia, residing in Washington, in the District of Columbia, have invented a new and useful Improvement in Instruments for Optical Observations; and I do hereby declare that the following is a full, clear, and exact description of the invention, which will enable others skilled in the art to which it pertains to use the same.

Optical instruments are at present constructed in such manner that the measuring of the movements takes place at a point which is more or less distant from the eyepiece, the point of observation, whereby errors of the instrument occur which must be considered in accurate observation. Such instruments also necessitate the changing of the observer's position with the different observations.

Optical instruments are used at present for determining the relative position of objects to each other, or to magnify distant objects for the purpose of investigating details thereof, which are otherwise indistinct to the eye. No instrument, however, is at present in existence by means of which the proportions of an object or of objects to each other can be measured. Such a process is the art of sketching, in which the proportions of objects are delineated, the only means for said process being the sketcher's eye, which, no matter how well it may be trained for said purpose, makes errors in the judgment of distances and proportions. Such errors will be in proportion to the area of view in which the eye is to estimate objects, and will become less important as the limit of view is reduced.

My invention relates to improvements in instruments for optical observations, the object being to provide an instrument by means of which the points of angles will be brought together directly in the point of observation, which is the observer's eye. Such an instrument is the perspective graphometer, to which the accompanying drawings refer.

The apparatus consists broadly of the following parts: a centrally-arranged eyepiece capable of rotation in a horizontal and a perpendicular plane, a diaphragm by which vision is limited to a part of a view or object to be drawn, and mechanism by which the diaphragm can be moved perpendicularly or horizontally in such manner as to cover consecutive portions of the view or object.

I am aware that devices have been used in which the plane of the picture is divided into squares by means of lines drawn upon a transparent medium; but such devices are inefficient and inoperative, owing to the fact that it is impossible to focus the eye upon two points at one time, so that, if the eye considers the lines upon the transparent medium, the scene beyond the same becomes blurred and indistinct, and vice versa. The devices referred to are also defective in that the squares being upon a flat plane and the point of sight opposite the center of said plane the squares cover different amounts of space as their angle and distance from the eye increases, the sketch being rendered thereby graphically inaccurate. The perspective graphometer is intended to overcome these difficulties and to serve as an accurate and reliable instrument for measurement and comparison of distant objects, and consists in the details of construction and combination of parts by which said results are secured, and which will be more fully described by reference to the accompanying drawings, in which—

Figure 2:
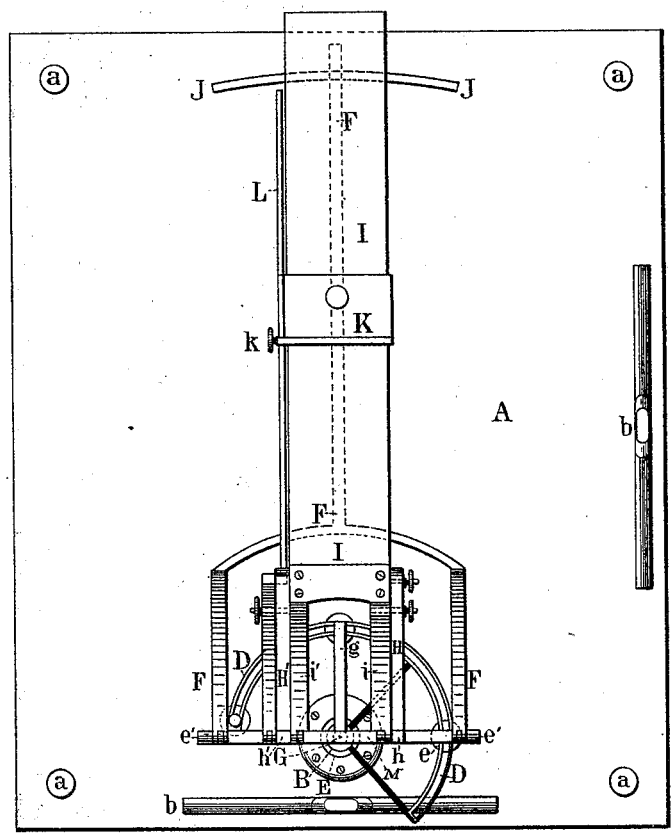
Figure 3:
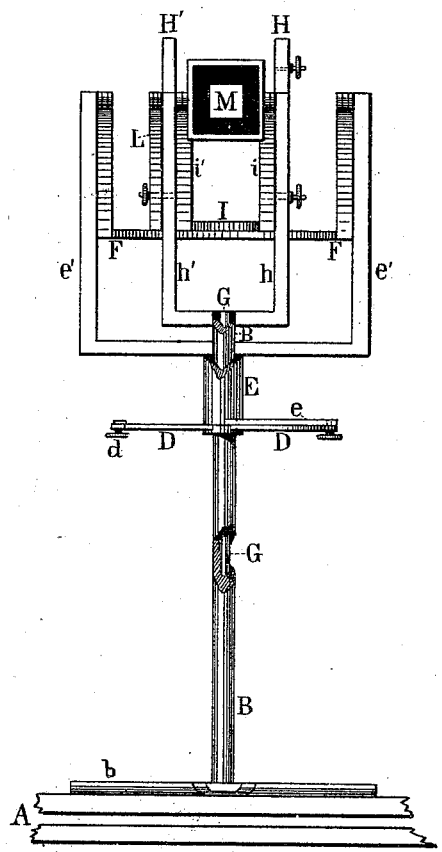

Figure 1 is a perspective view; Fig. 2 a plan view, and Fig. 3 a front elevation, of the instrument, showing both arms F F inside arms e e'.

Referring to the drawings, A is a supporting-base formed in two parts, connected with each other by adjusting-screws a a, by means of which the apparatus can be leveled, the base being provided with two spirit-levels b b, arranged at right angles to each other. The underlying part is provided with a central perforation, by means of which the instrument can be mounted upon a tripod for outdoor use, but may otherwise be supported in any other convenient manner which will admit of its ready use. Mounted upon and rigidly secured to the base A is a pillar B, by which all operative parts of the inactum are supported.

The pillar B is in its upper part a cylinder, and is also formed with a flange C, and attached to said flange is D, a horizontal arc of one hundred and twenty-five degrees, open in the middle. Upon the flange C rests a cylinder E, formed at its lower end with arm $e$ and at its upper end with laterally-extending brackets or arms $e'$ $e'$, forming a fork and supporting by means of pivots the arm F, which serves as the measure for the horizontal motion of the range of view.

Inserted into the cylindrical part of pillar B is a pin G, also formed at its lower end with an arm $g$ and at its upper end with laterally-extending brackets $h$ $h'$, to which brackets are rigidly fixed arcs H H', open in the middle, and to which same brackets are pivoted arcs $i$ $i'$, rigidly fixed to arm I, upon which the diaphragm-holder K may be fixed at any point. Arm I is held in any desirable position by the clamp-screw which connects arc $i$ with arc H.

At the front end of and at right angle to arm I is fixed the eyepiece M, and near the rear end said arm is provided with a loop J, which serves as a support for arm F, thus carrying said arm F along in any vertical movement of arm I. Pivoted to bracket $h'$ is arm L, which serves as the measure for the vertical motion of the range of view, and which arm is held in position by the clamp-screw which connects said arm with arc H'.

In connection herewith it may be stated that the eyepiece is located at the central point of all movements of the apparatus, and that therefore all observations terminate and can be measured in the point of observation, which obviates the necessity of considering errors, as must be done in the use of other instruments in which the center of movement and the eyepiece are two different points.

The proceeding in the use of this instrument would be as follows: Level the base by means of the screws $a$ $a$. Determine the left-hand limit of the horizontal range of view and mark said limit by screw $d$ upon the horizontal arc D. Set diaphragm K at such distance from the eyepiece M as will admit the desired amount of view, or, in other words, will divide the whole view or object to be sketched into the desired number of squares. To move the range of view horizontally, move arm $g$ along arc D, and to move the range of view vertically, move $i$ along arc H. Point the arm I at any desired part of the whole object, arresting its vertical movement by clamping arc $i$ to arc H and its horizontal movement by clamping arm $g$ to arc D. Having sketched the view admitted by diaphragm K into the corresponding square drawn with pencil upon your paper or canvas, move K to its next horizontal or higher or lower position. To move K to its next higher or lower position, raise or lower arm L as far as it can be moved along arc H' and clamp it by means of the connecting-screw. Arm L passes through the vertical loop attached to the diaphragm-holder and has its movement limited by sliding stop $k$ to a distance equal the dimension of the square opening in the diaphragm. Arm I is now raised or lowered by sliding arc $i$ along arc H, which motion will be limited by arm L. To move the range of view upon the next horizontal portion of the object, slide arm $e$ along arc D as far as it can be moved and clamp the same, the effect being that cylinder E, brackets $e'$ $e'$, and arm F are turned, the movement being limited in the horizontal loop at the bottom of the diaphragm-holder in the same manner as the vertical movement. Next slide arm $g$ along arc D as far as it can be moved and clamp it, which involves the movement of pin G, brackets $h$ $h'$, arcs $i$ $i'$, and the arm I, the movement again being limited by arm F. It will be seen that each limit of view touches upon the foregoing limit, which proceeding continues until the whole object or view has been covered.

Having fully described my invention, what I claim, and desire to secure by Letters Patent, is—

1. An instrument for optical observations and measurements, having an eyepiece, the center of which remains in a fixed position during horizontal or vertical movements of the range of view.

2. An instrument optically dividing into equal parts any view or object.

GREGOR NOETZEL.

Witnesses:
 ROBT. T. PLATT,
 JOHN STOWELL.